US011568624B1

(12) United States Patent
Ramanathan et al.

(10) Patent No.: US 11,568,624 B1
(45) Date of Patent: Jan. 31, 2023

(54) MANAGING VIRTUAL SURVEILLANCE WINDOWS FOR VIDEO SURVEILLANCE (71) Applicant: ObjectVideo Labs, LLC, Tysons, VA (US)

(72) Inventors: Narayanan Ramanathan, Chantilly, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 304 days.

(21) Appl. No.: 16/871,663

(22) Filed: May 11, 2020

Related U.S. Application Data (60) Provisional application No. 62/845,408, filed on May 9, 2019.

(51) Int. Cl.
G06V 10/24 (2022.01)
G06K 9/62 (2022.01)
H04N 5/262 (2006.01)
H04N 7/01 (2006.01)
H04N 7/18 (2006.01)
G06V 20/40 (2022.01)
G06V 20/52 (2022.01)

(52) U.S. Cl.
CPC ........... G06V 10/24 (2022.01); G06K 9/6227 (2013.01); G06V 20/41 (2022.01); G06V 20/52 (2022.01); H04N 5/2628 (2013.01); H04N 7/0117 (2013.01); H04N 7/183 (2013.01); G06V 20/44 (2022.01)

(58) Field of Classification Search
None
See application file for complete search history.

(56) References Cited

U.S. PATENT DOCUMENTS

| | | | | |
|---|---|---|---|---|
| 7,593,547 | B2 * | 9/2009 | Mittal | G06T 7/254 703/2 |
| 8,290,212 | B2 * | 10/2012 | Wheeler | G06T 7/246 348/148 |
| 8,369,570 | B2 * | 2/2013 | Myers | G06V 40/172 382/103 |
| 2012/0257793 | A1 * | 10/2012 | Brown | G06V 40/103 382/103 |
| 2015/0098661 | A1 * | 4/2015 | Brown | G06V 10/235 382/224 |
| 2017/0039729 | A1 * | 2/2017 | Wang | G06T 7/254 |
| 2019/0205694 | A1 * | 7/2019 | Wang | G06V 40/171 |

* cited by examiner

Primary Examiner — Tahmina N Ansari
(74) Attorney, Agent, or Firm — Fish & Richardson P.C.

(57) ABSTRACT

Methods, systems, and apparatus, including computer programs encoded on a computer storage medium, for managing virtual surveillance windows for video surveillance. The methods, systems, and apparatus include actions of obtaining an original video, generating a downscaled video from the original video, detecting a first event at a location from the downscaled video using a first classifier, generating a windowed video from the original video based on the location, detecting a second event from the windowed video, and performing an action in response to detecting the second event.

21 Claims, 4 Drawing Sheets

MANAGING VIRTUAL SURVEILLANCE WINDOWS FOR VIDEO SURVEILLANCE

CROSS-REFERENCE TO RELATED APPLICATIONS

This application claims the benefit of U.S. Provisional Application No. 62/845,408, filed May 9, 2019, which is incorporated by reference in its entirety.

TECHNICAL FIELD

This disclosure application relates generally to monitoring systems, and more particularly, to video surveillance.

SUMMARY

Techniques are described for managing virtual surveillance windows for video surveillance. In the era of high computing and ever decreasing hardware prices, high-resolution cameras have entered the consumer market and today's video surveillance solutions have the bandwidth to process incoming video frames in their original resolution (1920×1080 pixel resolution for instance) in real time. At such high resolutions, video surveillance solutions can reliably detect pedestrians, vehicles, animals at distances as far as one hundred feet.

Recently 4K cameras (4096×2160 pixel resolution) which pose four times the same resolution as their 1080p counterparts, have entered the consumer market. Apart from adding four times more detail to a scene, such cameras pose the ability to push the event detection ranges by a margin in comparison to 1080p cameras. A new series of such high-resolution cameras such as 5K, 6K, 7K and 8K cameras are lined up to hit the consumer market in the coming years. But there are many practical hurdles in deploying existing video surveillance solutions on such massive video streams.

First, operational settings of the many algorithms that make a video surveillance pipeline such as background subtraction, object detection/recognition, object tracking and activity inference may need to be revised to perform optimally at increased resolutions. Second, deep learning algorithms, ones that have been previously trained on object/scene appearances at lower resolutions, may perform suboptimally if deployed under much higher resolutions such as 4K. Third, training a deep network on object or scene appearances from much higher resolutions may be an expensive process, both from the perspective of data collection and manual annotation. Fourth, to meet real-time constraints, computational hardware may need to be increased to be able to process the increased video frame resolutions. This will likely increase operational costs for surveillance providers.

A suboptimal and short-term solution may be to scale down the resolution of incoming video streams into frame sizes that existing video surveillance solutions are accustomed with. But the downside to this approach is in throwing away valuable image detail while running surveillance algorithms and thereby not using higher resolution cameras' to their fullest potential and voiding the real purpose behind users purchasing higher resolution cameras.

A solution to the above hurdles of operating with massive video streams may enable higher resolution from higher resolution cameras to be used while utilizing pre-existing classifiers trained on lower resolution video. Generally, the solution may include upon deploying a high-resolution surveillance camera (e.g., 4K/8K or more), a system may generate virtual surveillance windows of pre-set resolution (the resolution at which existing surveillance classifiers are trained and tested to perform optimally) from different parts of the scene and runs surveillance classifiers on each window independently. A virtual surveillance window may run a process that analyzes a portion of the video stream at a lower resolution than the video stream. Each virtual surveillance window may act as a camera stream by itself (fixed field of view) and may be assigned dedicated computational resources for its processing.

Using a higher resolution camera may enable a single camera to replace multiple lower resolution cameras. For example, the higher resolution camera may have a wider view than a lower resolution camera while representing the same field of view covered by the lower resolution with the same or more pixels. Additionally or alternatively, a higher resolution camera may enable detections at further distances. For example, the higher resolution camera may show a distant area with more pixels than a lower resolution camera so that motion may be detected in the distant area from the higher resolution video when motion would not have been detected in the distant area from lower resolution video.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1A:
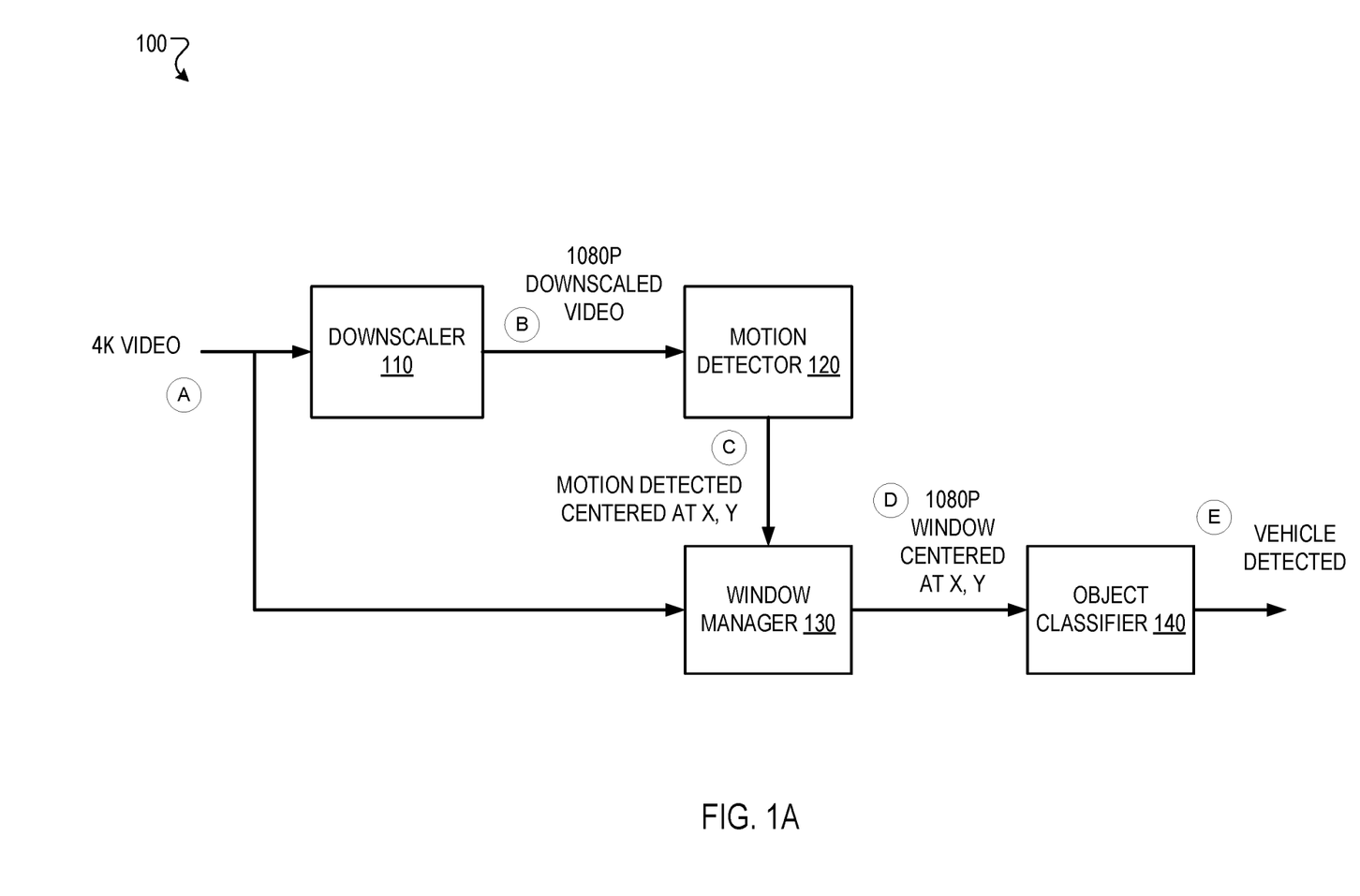
FIG. 1A illustrates a block diagram of an example system for managing virtual surveillance windows for surveillance.

FIG. 1A illustrates an example block diagram of a system 100 for managing virtual surveillance windows for surveillance. Briefly, the system 100 includes a downscaler 110 that downscales video to downscaled video, a motion detector 120 that analyzes the downscaled video for motion, a window manager 130 that manages virtual surveillance windows, and an object classifier 140 that classifies objects for a virtual surveillance window. While the system 100 is described as including the motion detector 120 and the object classifier 140, the system 100 may include alternate classifiers. For example, the motion detector 120 may instead be a high level event detector and the object classifier 140 may a lower level event detector.

The downscaler 110 may obtain video and downscale the video to a lower resolution. For example, the downscaler 110 may receive a video at 4K resolution, and generate a video at 1080P by averaging groups of two by two pixels in the video at 4K resolution. In another example, the downscaler 110 may receive a video at 4K resolution, and generate a video at 1080P by sub-sampling the 4K resolution video to skip every other column and every other row.

The motion detector 120 may obtain the downscaled video and detect motion in the downscaled video. For example, the motion detector may receive the 1080P downscaled video, and then detect motion centered at coordinates of (640, 360) in the upper left of the 1080P downscaled video. In another example, the motion detector may receive the 1080P downscaled video, and then detect motion centered at coordinates of (1280, 720) in the lower right of the 1080P downscaled video.

The motion detector 120 may be trained on 1080P video so may process the 1080P downscaled video normally. Analyzing the 1080P downscaled video may not result in much performance loss as detecting motion may not require high detail in pixels. For example, typically motion in video involves changes in many pixels.

The motion detector 120 may provide an indication of the motion to the window manager 130. For example, the motion detector 120 may provide an indication of "motion detected centered at (640, 360)" to the window manager 130. In another, the motion detector 120 may provide an indication of "motion detected centered at (1280, 720)" to the window manager 130.

The window manager 130 may obtain the indication of the motion and the video at the original resolution and generate a virtual surveillance window. For example, the window manager 130 may obtain the indication of "motion detected centered at (640, 360)" and, in response, generate a 1080P video from extracting a 1080P portion centered at (1280, 720) in the video at 4K resolution. In another example, the window manager 130 may obtain the indication of "motion detected centered at (1280, 720)" and, in response, generate a 1080P video from extracting a 1080P portion centered at (2560, 1440) in the video at 4K resolution.

The window manager 130 may generate the virtual surveillance window by determining a location in the video at the original resolution that corresponds to the location that the motion was detected in the downscaled video. For example, the window manager 130 may determine that as a video was downscaled to one fourth of the resolution, any coordinates from the downscaled video should be multiplied by two to determine corresponding coordinates in the video at original resolution.

The window manager 130 may then take the location in the video at the original resolution, and extract a 1080P video from the original video based on the location. For example, the window manager 130 may take the coordinates of (1280, 720) in the 4K video, and then generate a 1080 video by taking the portion of the 4K video between the coordinates (320, 180), (2240, 180), (320, 1260), and (2240, 1260). Where the location in the original resolution video is close to an edge of the video so that a video cannot be extracted centered on the location, the window managers 130 may generate a lower resolution video from a portion of the 4K video that is centered closer to a center of the 4K video. For example, the window manager 130 may determine a location in the original resolution of (20, 20) in the 4K video, determine that a 1080P video cannot be extracted centered around (20, 20) in the 4K video, determine that a 1080P video can be extracted centered around (960, 540) that includes all pixels centered around (20, 20) within 960 pixels horizontally and 540 pixels vertically in the 4K video.

The window manager 130 may provide the extracted 1080P to the object classifier 140. For example, the window manager 130 may provide the portion of the 4K video between the coordinates (320, 180), (2240, 180), (320, 1260), and (2240, 1260) to the object classifier 140.

The object classifier 140 may be trained using 1080P video, receive the 1080P video from the window manager 130, and then classify objects in the video. For example, the object classifier may be trained to detect vehicles using 1080P video, receive the 1080P video extracted from the 4K video by the window manager 130, and then detect a vehicle in the 1080P video.

The window manager 130 may manage multiple virtual surveillance windows. For example, the window manager 130 may detect motion centered around two different locations in the 4K video, generate two 1080P videos from the 4K video each centered around a respective one of the locations, and separately provide each of the 1080P videos to an object classifier 140. Accordingly, the window manager 130 may classify objects for two different portions of the 4K video in parallel.

In some implementations, the window manager 130 may change the portion of the video analyzed by the virtual surveillance window. For example, the window manager 130 may determine a location of motion in a 4K video is moving and, in response, as the location of motion moves in the 4K video, adjust the extracted portion of the 4K to be centered on the motion.

In some implementations, the window manager 130 may similarly generate new virtual surveillance windows based on tracking. For example, the window manager 130 may determine that an object's trajectory will show it in another portion of the 4K video that is not included in a virtual surveillance window and, in response, generate a new virtual surveillance window that includes that portion of the 4K video in a 1080P video.

In some implementations, the window manager 130 may stop using a virtual surveillance window. For example, the window manager 130 may determine that motion that resulted in a virtual surveillance window being generated has no longer been detected for ten, thirty, sixty seconds, or some other amount of time, and, in response, determine to stop extracting 1080P video and stop providing extracted 1080P video to the object classifier 140.

In some implementations, the window manager 130 may create permanent virtual surveillance windows. For example, the window manager 130 may divide the 4K resolution video into four 1080P video that cover separate quadrants of the 4K resolution video and provide the four 1080P video to separate object classifiers 140. In some implementations, the window manager 130 may create permanent virtual surveillance windows based on scene analysis. For example, the window manager 130 may determine that a portion of the 4K video shows a driveway and, in response, generates a permanent virtual surveillance window for a 1080P video of the driveway. The window manager 130 may determine a criticality of locations under surveillance as some locations may always need surveillance irrespective of motion presence or absence. For example, the window manager 130 may determine from downscaled video or the original 4K video that a door is shown and, in response, determine to create a permanent virtual surveillance window that includes the entirety of the door.

In some implementations, the window manager 130 may select an algorithm to use for a specific virtual surveillance windows. For example, the window manager 130 may determine that a 1080P video depicts an area that is closer to a camera and may have more pixels covering a face or vehicle, in response, use an algorithm for face detection, face recognition, vehicle identification, familiar person recognition, and/or familiar vehicle recognition etc. The window manager 130 may determine an event type for portions of a scene. For example, the window manager 130 may determine that a portion of the scene known for only pedestrian activity will be preset with surveillance window resolutions that are optimal for pretrained person detection models to work well. Similarly, portions of the scene known for vehicular activity or a combination of pedestrian and vehicular activity will be assigned surveillance windows that best reflect the pretrained object detection models for the respective events.

In some implementations, the window manager 130 may generate virtual surveillance windows based on object-to-object interactions and object-to-scene interactions. For instance, tracking a vehicle as it is approaching the building may be important, but it may be more important to see who disembarked from the vehicle. Similarly, tracking a person approaching a building may be important, but knowing which entry way the person adopted to enter into the facility may be more important. In the two examples here, the window manager 130 may generate low resolution surveillance windows running basic event detection and tracking algorithms for portions of the scene where the object is approaching the facility and generate higher resolution surveillance windows that will run sophisticated object identification algorithms in regions where the person disembarks from the vehicle or enters into a facility.

In some implementations, the window manager 130 may generate virtual surveillance windows based on event prediction. For example, the window manager 130 may detect an event in one portion of the scene and generate a new virtual surveillance window in another portion of the scene in which an event is likely to occur based on the event detected.

In some implementations, the window manager 130 may generate virtual surveillance windows based on event unusualness. For example, the window manager 130 may receive an indication from a surveillance window that loitering or other kinds of suspicious behavior (larger groups of individuals assembling/pedestrian hovering over parked vehicles/pedestrian waiting outside an entrance) has been detected and, in response, may introduce another surveillance window at higher resolution to enable face detection.

In some implementations, the window manager 130 may use scene-awareness to generate virtual surveillance windows. For example, the window manager 130 may determine that a scene includes a swimming pool in a backyard and, in response, may generate a surveillance window that provide the best chance for detection of pedestrians. In another example, the window manager 130 may determine that a scene includes lot of trees in the backyard and, in response, may generate a surveillance window better suited for detecting animals. Additionally, the window manager 130 may also determine to have the surveillance window for the pool for detecting pedestrians use continuous monitoring as the region may be critical while determining to have the surveillance window for the backyard for detecting animals only be activated when motion is detected.

In some implementations, the window manager 130 may generate surveillance windows based on video from other cameras. For example, the window manager 130 managing surveillance windows in video from a first camera may receive an indication that a vehicle was detected in video from another camera headed in a direction that should have the vehicle appear in a lower right corner of the video for the first camera and, in response, generate a surveillance window covering the lower right corner of the video for the first camera even before the vehicle appears in the video from the first camera.

In some implementations, the downscaler 110, motion detector 120, window manager 130, and object classifier 140 may be implemented on a camera. For example, a 4K camera may include a processor that executes the downscaler 110, motion detector 120, window manager 130, and object classifier 140.

In some implementations, the downscaler 110, motion detector 120, window manager 130, and object classifier 140 may be implemented on a monitor control unit in a property. For example, a 4K camera on a property may stream video over a local area network to a security control panel or video server on the property, and the security control panel or video server may host the downscaler 110, motion detector 120, window manager 130, and object classifier 140.

In some implementations, the downscaler 110, motion detector 120, window manager 130, and object classifier 140 may be implemented on a server remote from a property. For example, a 4K camera on a property may stream video over the Internet to a server that is remote from the property, and the server may host the downscaler 110, motion detector 120, window manager 130, and object classifier 140.

Figure 1B:
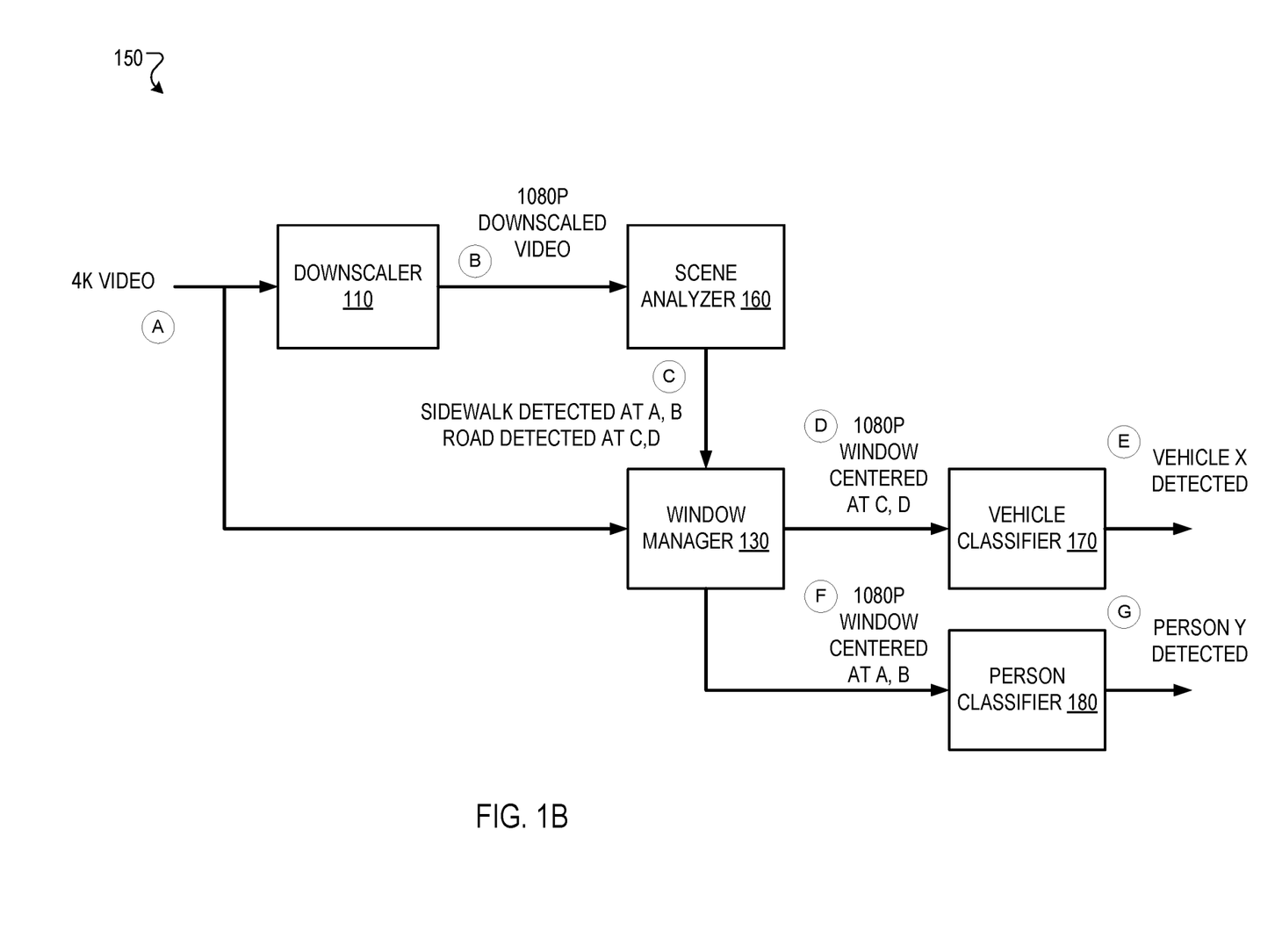
FIG. 1B illustrates a block diagram of another example system for managing virtual surveillance windows for surveillance.

FIG. 1B illustrates a block diagram of another example system 200 for managing virtual surveillance windows for surveillance. The system 200 may include the downscaler 110 and window manager 130 of system 100, and also include a scene analyzer 160, vehicle classifier 170, and person classifier 180. The scene analyzer 160 may analyze the downscaled video and detect a sidewalk at coordinates A, B and a road at coordinates C, D in the video.

The window manager 130 may receive indications of the objects and coordinates from the scene analyzer 160 and, in response, generate a 1080P surveillance window centered around coordinates C, D that uses a person classifier 180 that detects that Person Y is in the video and generate a 1080P surveillance window centered around coordinates A, B that uses a vehicle classifier 170 that detects that Vehicle X is in the video.

Figure 2:
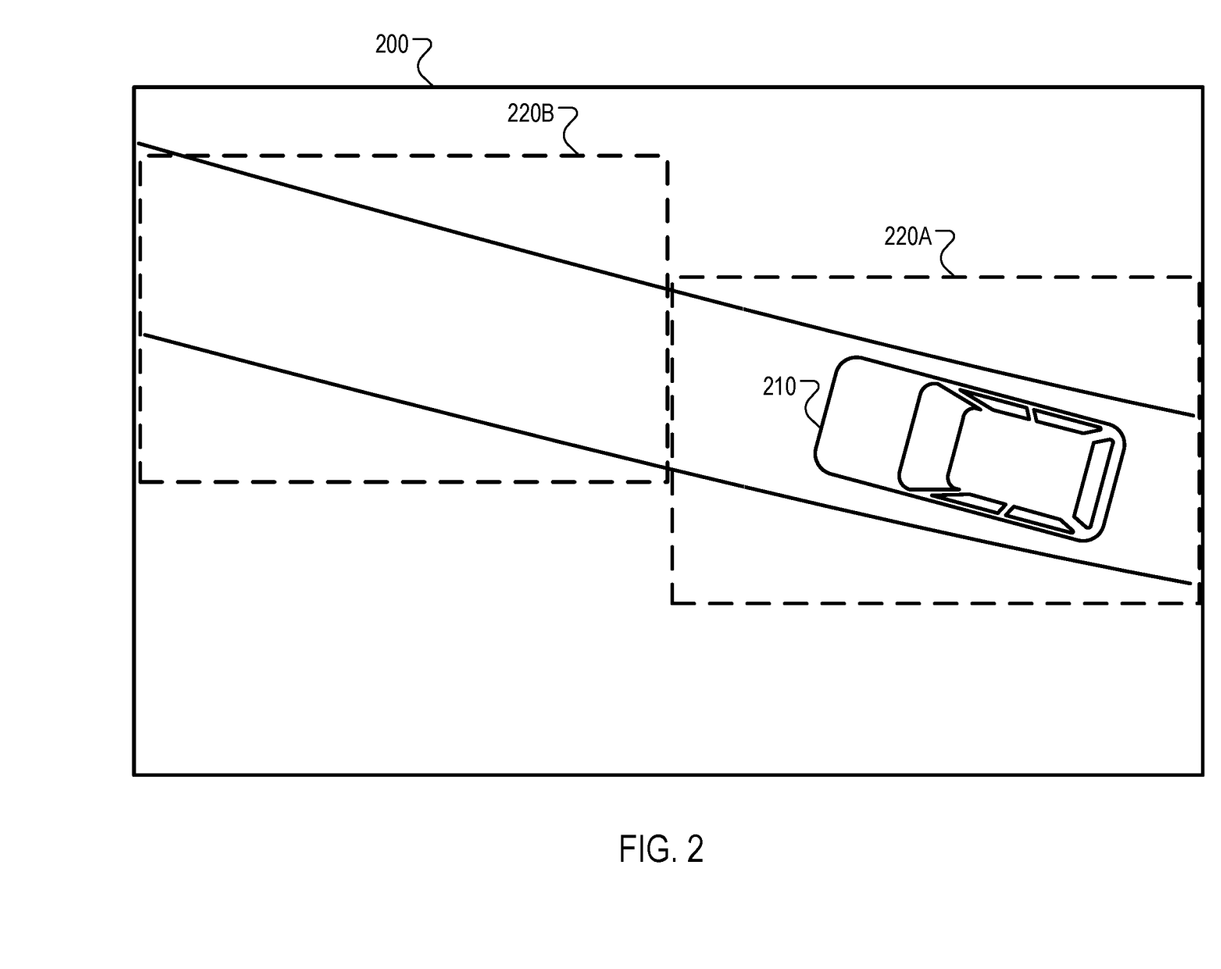
FIG. 2 illustrates an example frame of high resolution video that is being analyzed with two virtual surveillance windows.

FIG. 2 illustrates an example frame of high resolution video 200 that is being analyzed with two virtual surveillance windows 220A, 220B. As shown in FIG. 2, a vehicle 210 is shown moving along a path where the vehicle is currently being shown in a portion of the video 200 corresponding to the first virtual surveillance window 220A and will later be shown in another portion of the video 200 corresponding to the second virtual surveillance window 220B.

Accordingly, the window manager 130 may initially generate the first virtual surveillance window 220A when motion is initially detected, and once the window manager 130 determines the trajectory of the motion includes the portion shown in the second virtual surveillance window 220B, then generate the second virtual surveillance window 220B. As shown in FIG. 2, the window manager 130 may generate the second virtual surveillance window so that the window does not overlap the first virtual surveillance window and is adjacent to the first virtual surveillance window.

Figure 3:
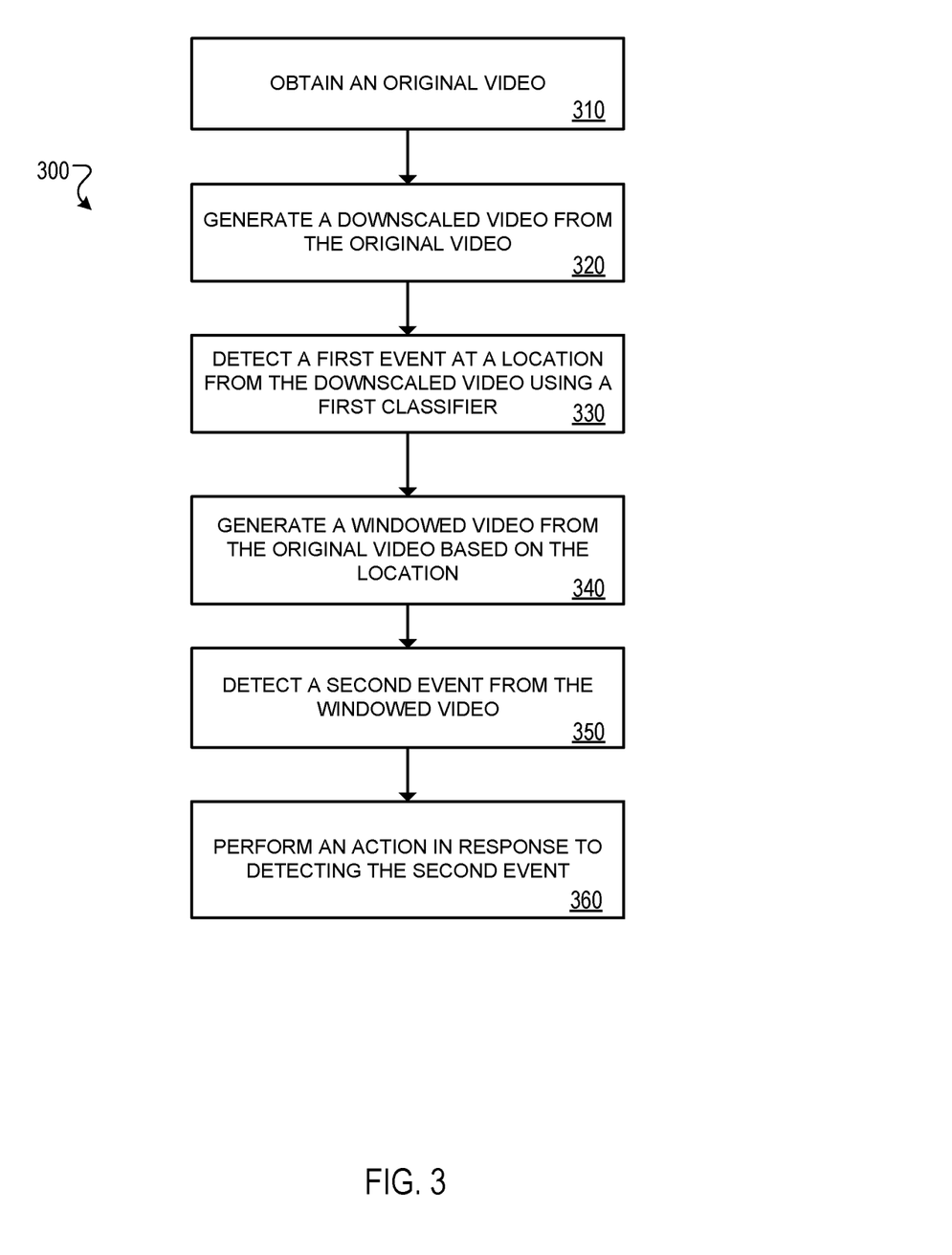
FIG. 3 is a flow diagram of an example process for managing virtual surveillance windows for surveillance.

FIG. 3 is a flow diagram of an example process 300 for managing virtual surveillance windows for surveillance. Process 300 can be implemented using system 100 described above or some other system. Thus, descriptions of process 300 may reference one or more of the above-mentioned components, modules, or computational devices of system 100. In some implementations, described actions of process 300 are enabled by computing logic or software instructions executable by a processor and memory of an example electronic device.

The process 300 includes obtaining an original video (310). For example, the downscaler 110 may obtain a 4K video stream from a 4K camera on a property.

The process 300 includes generating a downscaled video from the original video (320). For example, the downscaler 110 may subsample the 4K video to generate a 1080P video. In another example, the downscaler 110 may average two by two squares of pixels in the 4K video to generate a 1080P video.

The process 300 includes detecting a first event at a location from the downscaled video using a first classifier (330). For example, the motion detector 120 may detect motion centered around a particular pixel in the 1080P video. In some implementations, the first classifier is trained to detect events in video at a lower resolution than the original video. For example, the first classifier may be trained to detect events in 1080P video and may not accurately detect events in 4K video, and the original video may be 4K video. In another example, the first classifier may be trained to detect events in 720P video and may not accurately detect events in 8K video, and the original video may be 8K video.

The process 300 includes generating a windowed video from the original video based on the location (340). For example, the window manager 130 may generate a 1080P video from the 4K video by taking the corresponding particular pixel in the 4K video as a center of the 1080P video. In some implementations, generating a windowed video from the original video based on the location includes generating the windowed video from the original video by including values for pixels in the original video as values in the windowed video. For example, the window manager 130 may generate the windowed video as a 1080P video where, for each frame, all the values of the pixels in the 1080P video are identical to the values of the pixels in the corresponding area in the 4K video from which the 1080P video was generated.

In some implementations, generating a windowed video from the original video based on the location includes generating the windowed video as a contiguous area of the original video. For example, the window manager 130 may generate a 1080P video by extracting a 1080P portion centered at (2560, 1440) in original video at 4K resolution.

In some implementations, generating a windowed video from the original video based on the location include obtaining coordinates for the location in the original video and generating the windowed video as an area of the original video centered around the coordinates at a resolution less than a resolution of the original video. For example, the window manager 130 may obtain the indication of "motion detected centered at (640, 360)" and, in response, generate a 1080P video from extracting a 1080P portion centered at (1280, 720) in the video at 4K resolution.

In some implementations, generating a windowed video from the original video based on the location includes, where the location in the original resolution video is close to an edge of the video so that a video cannot be extracted centered on the location, generating a lower resolution video from a portion of the original video that is centered closer to a center of the original video. For example, the window manager 130 may determine a location in the original resolution of (20, 20) in the 4K video, determine that a 1080P video cannot be extracted centered around (20, 20) in the 4K video, determine that a 1080P video can be extracted centered around (960, 540) that includes all pixels centered around (20, 20) within 960 pixels horizontally and 540 pixels vertically in the 4K video, and then generate the 1080P video centered around (960, 540) that includes all pixels centered around (20, 20) within 960 pixels horizontally and 540 pixels vertically in the 4K video.

In some implementations, the process 300 includes detecting a second event from the windowed video (350). For example, the object classifier 140 may detect the presence of a vehicle. In some implementations, detecting a second event from the windowed video includes detecting the second event using a second classifier that is trained to detect events in video both at a resolution of the windowed video and at a resolution lower than a resolution of the original video. For example, the window manager 130 may provide the windowed video at 1080P resolution to the object classifier 140, where the object classifier 140 is trained on 1080P video and does not accurately detect objects at the 4K resolution of the original video.

In some implementations, detecting the second event using a second classifier that is trained to detect events in video both at a resolution of the windowed video and at a resolution lower than a resolution of the original video includes determining a type of the first event and selecting, based on the type of the first event, the second classifier from among a set of classifiers that are each associated with a respective type of event. For example, the window manager 130 may determine that the scene analyzer 160 has detected a vehicle present event and, in response, selects the vehicle classifier 170 instead of the person classifier 180, for the vehicle classifier 170 to classify what type of vehicle is present.

The process 300 includes performing an action in response to detecting the second event (360). For example, in response to detecting the presence of the vehicle, the object classifier 140 may instruct that a notification be sent to a home owner that a vehicle was detected or may instruct that the 4K video be stored labeled with an indication that a vehicle was detected. In some implementations, performing an action in response to detecting the second event includes at least one of providing an indication that the second event was detected or triggering a monitoring system to control a device within a property. For example, in response to detecting in doorbell camera video that a home owner has walked up to the front door, the person classifier 180 may provide the classification of "home owner" to a monitoring system of a home which may then instruct a front door lock to unlock.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), E53lectrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed Application-Specific Integrated Circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining a plurality of first video frames that have a first video resolution;
generating a plurality of downscaled video frames from the plurality of first video frames, the plurality of downscaled video frames having a second video resolution that is lower than the first video resolution;
detecting, using a first classifier, a first event at a location in at least one first frame from the plurality of downscaled video frames;
generating, using the plurality of first video frames and the location in the at least one first frame from the plurality of downscaled video frames, a plurality of windowed video frames that include content from the plurality of first video frames and have a third video resolution that is lower than the first video resolution;
detecting a second event in at least one second frame from the plurality of windowed video frames that a) include content from the plurality of first video frames, b) have the third video resolution that is lower than the first video resolution, and c) were generated using the location of the first event detected in the at least one first frame from the plurality of downscaled video frames; and
performing an action in response to detecting the second event.

2. The method of claim 1, wherein generating a windowed video from the original video based on the location comprises:
generating the windowed video from the original video by including values for pixels in the original video as values in the windowed video.

3. The method of claim 1, wherein generating a windowed video from the original video based on the location comprises:
generating the windowed video as a contiguous area of the original video.

4. The method of claim 3, wherein generating a windowed video from the original video based on the location comprises:
obtaining coordinates for the location in the original video; and
generating the windowed video as an area of the original video centered around the coordinates at a resolution less than a resolution of the original video.

5. The method of claim 1, wherein detecting a second event from the windowed video comprises:
detecting the second event using a second classifier that is trained to detect events in video both at a resolution of the windowed video and at a resolution lower than a resolution of the original video.

6. The method of claim 5, wherein the resolution of the windowed video is 1080P resolution and the resolution of the original video is 4K resolution.

7. The method of claim 5, wherein detecting the second event using a second classifier that is trained to detect events in video both at a resolution of the windowed video and at a resolution lower than a resolution of the original video comprises:
determining a type of the first event; and
selecting, based the type of the first event, the second classifier from among a set of classifiers that are each associated with a respective type of event.

8. The method of claim 1, wherein the first classifier is trained to detect events in video at a lower resolution than the original video.

9. The method of claim 1, wherein performing an action in response to detecting the second event comprises at least one of:
providing an indication that the second event was detected; or
triggering a monitoring system to control a device within a property.

10. A system comprising:
one or more computers and one or more storage devices storing instructions that are operable, when executed by the one or more computers, to cause the one or more computers to perform operations comprising:
obtaining a plurality of first video frames that have a first video resolution;
generating a plurality of downscaled video frames from the plurality of first video frames, the plurality of downscaled video frames having a second video resolution that is lower than the first video resolution;
detecting, using a first classifier, a first event at a location in at least one first frame from the plurality of downscaled video frames;
generating, using the plurality of first video frames and the location in the at least one first frame from the plurality of downscaled video frames, a plurality of windowed video frames that include content from the plurality of first video frames and have a third video resolution that is lower than the first video resolution;
detecting a second event in at least one second frame from the plurality of windowed video frames that a) include content from the plurality of first video frames, b) have the third video resolution that is lower than the first video resolution, and c) were generated using the location of the first event detected in the at least one first frame from the plurality of downscaled video frames; and
performing an action in response to detecting the second event.

11. The system of claim 10, wherein generating a windowed video from the original video based on the location comprises:

generating the windowed video from the original video by including values for pixels in the original video as values in the windowed video.

12. The system of claim 10, wherein generating a windowed video from the original video based on the location comprises:
generating the windowed video as a contiguous area of the original video.

13. The system of claim 12, wherein generating a windowed video from the original video based on the location comprises:
obtaining coordinates for the location in the original video; and
generating the windowed video as an area of the original video centered around the coordinates at a resolution less than a resolution of the original video.

14. The system of claim 10, wherein detecting a second event from the windowed video comprises:
detecting the second event using a second classifier that is trained to detect events in video both at a resolution of the windowed video and at a resolution lower than a resolution of the original video.

15. The system of claim 14, wherein the resolution of the windowed video is 1080P resolution and the resolution of the original video is 4K resolution.

16. The system of claim 14, wherein detecting the second event using a second classifier that is trained to detect events in video both at a resolution of the windowed video and at a resolution lower than a resolution of the original video comprises:
determining a type of the first event; and
selecting, based the type of the first event, the second classifier from among a set of classifiers that are each associated with a respective type of event.

17. The system of claim 10, wherein the first classifier is trained to detect events in video at a lower resolution than the original video.

18. The system of claim 10, wherein performing an action in response to detecting the second event comprises at least one of:
providing an indication that the second event was detected; or
triggering a monitoring system to control a device within a property.

19. A non-transitory computer-readable medium storing software comprising instructions executable by one or more computers which, upon such execution, cause the one or more computers to perform operations comprising:
obtaining a plurality of first video frames that have a first video resolution;
generating a plurality of downscaled video frames from the plurality of first video frames, the plurality of downscaled video frames having a second video resolution that is lower than the first video resolution;
detecting, using a first classifier, a first event at a location in at least one first frame from the plurality of downscaled video frames;
generating, using the plurality of first video frames and the location in the at least one first frame from the plurality of downscaled video frames, a plurality of windowed video frames that include content from the plurality of first video frames and have a third video resolution that is lower than the first video resolution;
detecting a second event in at least one second frame from the plurality of windowed video frames that a) include content from the plurality of first video frames, b) have the third video resolution that is lower than the first video resolution, and c) were generated using the location of the first event detected in the at least one first frame from the plurality of downscaled video frames; and
performing an action in response to detecting the second event.

20. The medium of claim 19, wherein generating a windowed video from the original video based on the location comprises:
generating the windowed video from the original video by including values for pixels in the original video as values in the windowed video.

21. The method of claim 1, wherein the second video resolution and the third video resolution are the same video resolution.

* * * * *

UNITED STATES PATENT AND TRADEMARK OFFICE
CERTIFICATE OF CORRECTION

| | |
|---|---|
| PATENT NO. | : 11,568,624 B1 |
| APPLICATION NO. | : 16/871663 |
| DATED | : January 31, 2023 |
| INVENTOR(S) | : Narayanan Ramanathan and Allison Beach |

It is certified that error appears in the above-identified patent and that said Letters Patent is hereby corrected as shown below:

In the Claims

In Claim 7, Column 10, Line 22, after "based" insert -- on --.

In Claim 16, Column 11, Line 32, after "based" insert -- on --.

Signed and Sealed this
Eighteenth Day of April, 2023

Katherine Kelly Vidal
*Director of the United States Patent and Trademark Office*